United States Patent
Raetzsch et al.

(10) Patent No.: US 6,388,020 B2
(45) Date of Patent: *May 14, 2002

(54) STRUCTURAL ISOMERS OF POLY (ALKYL ETHYLENES)

(75) Inventors: Manfred Raetzsch, Kirchschlag; Achim Hesse, Linz; Hartmut Bucka, Eggendorf; Norbert Reichelt, Neuhofen; Ulf Panzer, Perg, all of (AT); Konrad Buehler, Poedelist (DE)

(73) Assignee: Borealis GmbH, Schwechat-Mannswoerth (AT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/790,342

(22) Filed: Jan. 27, 1997

(30) Foreign Application Priority Data

Feb. 1, 1996 (DE) .......................... 196 03 439
Feb. 1, 1996 (DE) .......................... 196 03 438
Feb. 1, 1996 (DE) .......................... 196 03 600

(51) Int. Cl.$^7$ ...................... C08F 255/00; C08F 265/00; C08F 265/04
(52) U.S. Cl. ...................... 525/242; 525/267; 525/273; 525/307; 525/311; 525/313; 525/319; 525/320
(58) Field of Search ................... 525/263, 307, 525/311, 313, 319, 320, 242, 267, 273

(56) References Cited

U.S. PATENT DOCUMENTS

| | | | |
|---|---|---|---|
| 5,047,446 A | * 9/1991 | DeNicola et al. | 522/157 |
| 5,047,485 A | * 9/1991 | DeNicola et al. | 525/387 |
| 5,364,907 A | * 11/1994 | Rolando et al. | 525/69 |
| 5,411,994 A | * 5/1995 | Galli et al. | 521/50.5 |
| 5,464,907 A | * 11/1995 | Jelenic et al. | 525/303 |
| 5,554,668 A | * 9/1996 | Scheve et al. | 522/157 |
| 5,560,886 A | * 10/1996 | Saito et al. | 264/485 |
| 5,814,714 A | * 9/1998 | Palomo et al. | 526/336 |

* cited by examiner

Primary Examiner—Jeffrey Mullis
(74) Attorney, Agent, or Firm—Jordan and Hamburg LLP

(57) ABSTRACT

Structurally isomeric poly(alkyl ethylenes) with H and Y structures, polymeric bridging segments and a Y index of $2 \times 10^{-3}$ to $8 \times 10^{-3}$ (kJ/mole/degree), have decreased instability in the melt and more advantageous processing properties. The structurally isomeric poly(alkyl ethylenes) with H and Y structures are synthesized by an irradiating method, a melt reaction method or a solid phase reaction method by reacting poly(alkyl ethylenes) with 0.05 to 5% by weight of monofunctional, difunctional and polyfunctional monomers, optionally in the presence of peroxides. The structurally isomeric poly(alkyl ethylenes) are suitable for producing films, sheets, panels, coatings, pipes, hollow objects and foams.

5 Claims, No Drawings

STRUCTURAL ISOMERS OF POLY (ALKYL ETHYLENES)

BACKGROUND OF THE INVENTION

In contrast to polyethylene, poly(alkyl ethylenes) have a series of disadvantages for thermoplastic processing, such as an increased instability of the melt and, associated therewith, a smaller processing window. Compared to polyethylene, unmodified poly(alkyl ethylenes) can be processed only at a significantly lower rate.

Poly(ethyl ethylenes) of improved processability are attained by the synthesis of poly(ethyl ethylene co-ethylene) copolymers (Natta, G., J. Polymer Sci. 51 (1961), 387–398; Chim. Ind. (Milano) 41 (1959), 764; Yu, T., J. Plastic Film Sheeting 10(1994) 1, 539–564), as well as by grafting with styrene, vinyl chloride (Natta, Polymer Sci. 34 (1959), 685–698) or acrylonitrile (U.S. Pat. No. 3,141,862). Blends of poly(ethyl ethylene) and polyethylene likewise have favorable processing properties (Hwo, C., J. Plast. Film Sheeting 3 (1987), 245–260; Kishore, K., Polymer 27 (1986), 337–343).

It is furthermore known that the instability of poly(methyl ethylene) melts can be decreased by additions of polyethylene (Ramsteiner, F., Polymer 24(1983), 365–370), polyethylene/poly(ethylene co-methylethylene) mixtures (Wasiak, A., ANTEC 1992, 1265–1266) or poly(ethylene co-acetoxyethylene) (Gupta, A. J. Appl. Polymer. Sci. 46(1992), 281–293). Enlarging the processing window of poly(methyl ethylene) is also brought about by treating the powder in the solid phase with ionizing radiation (EP 190889), peroxides (EP 384431) or monomer/peroxide mixtures (EP 437808). A treatment of poly(methyl ethylene)/polyethylene melts with peroxides is also known (Xanthos, M., Adv. Polym. Techn. 11(1992)4, 295–304).

Known methods for decreasing the melt instability of poly(isobutyl ethylene) are the synthesis of poly(isobutyl ethylene co-ethylene) copolymers (Yu, T., J. Plast. Film Sheeting 10 (1994)1, 539–564), poly(isobutyl ethylene co-hexyl ethylene ) copolymers and poly(isobutyl ethylene co-hexadecylethylene) copolymers (Campbell, J. Appl. Polymer Sci. 5 (1961)4, 184–190; Hambling, J., Rubber Plast. Age 49(1968) 3, 224–227), of poly(isobutyl ethylene co-phenylethylene) copolymers (Krenzel, V., Plast. Massy (1972)3, 57–59; Kissin, Y., Eur. Polymer J. 8 (1972)3, 487–499) as well as the synthesis of poly(isobutyl ethylene g-phenylethylene) graft copolymer (Wilson, J., J. Macromol. Sci. A6 (1972)2, 391–402).

Also known is the cross linking of poly(methyl ethylene co-ethylene), poly(methyl ethylene) and poly(acetyl ethylene co-ethylene) by irradiation to increase the thermoforming stability and the modulus (N. Brooks, J. Irradiation Techn. 1(1983)3, 237–257). Furthermore, investigations have been made of the absorption of monomers by powdery poly(alkyl ethylenes) (Rätzsch, M., Angew. Makromol. Chemie 229 (1995), 145–158).

It is a disadvantage of these methods that the advantageous material properties of poly(alkyl ethylenes), such as thermoforming stability, transparency and modulus, are decreased by the high proportion of modifying components during the copolymerization, grafting and alloying.

SUMMARY OF THE INVENTION

The invention is based on the problem of improving the processing properties of poly(alkyl ethylenes), so as to obtain the latter with advantageous material properties. This problem was surprisingly solved by the structural isomerization of poly(alkyl ethylenes) for which poly(alkyl ethylenes) of different chain length are linked by polymeric bridging segments into structurally isomeric poly(alkyl ethylene) with an H and a Y structure.

DETAILED DESCRIPTION OF THE INVENTION

The poly (alkyl ethylenes) of the present invention and a process for making the same are described herein.

The $\psi$ index has proven to be a suitable criterion for characterizing the processing behavior of poly(alkyl ethylenes):

$$\psi = Tm \times \Delta Hm \times \beta \times \xi \times Tg^{-1} \text{ (kJ/mole/degree)}$$

in which

Tm=melting temperature (°K.)

ΔHm=heat of fusion (kJ/mole)

$\beta$=coefficient of linear thermal expansion at 25° C. (1/degree)

$\xi$=threshold value

Tg=glass transition temperature (°K.)

The melting temperature (Tm(°K.) and heat of fusion DHm (kJ/mole) are determined according to the methods of the DIN 51004 or ISO 3146. The coefficient of linear thermal expansion b (1/degree) at 24° C. is determined according to the method of DIN 53752. The threshold value x is determined by the MFI determination according to the method of the ISO 1131 by determining the strand diameter of the structurally isomeric polyalkylethylene $d_I$ (mm) produced, as well as the strand diameter of the unmodified polyalkylethylene starting material $d_A$ (mm) and forming the ratio $d_I/d_A$. The glass transition temperature is determined by the method of DIN 61006.

For the starting materials (unmodified polyalkylethylene), the melting temperature, glass transition temperature, heat of fusion and coefficient of linear thermal expansion $\beta$ can be taken from tabulated values, such as those of Brandrup-Immergut "Polymer Handbook", John Wiley & Sons, New York, 1989 (ISBN 0-471-81244-7).

Pursuant to the invention, the poly(alkyl ethylenes), with an H and a Y structure and a $\psi$ index of $2 \times 10^{-3}$ to $8 \times 10^{-3}$ (kJ/mole/degree), have significantly more advantageous processing properties than do unmodified poly(alkyl ethylenes). For example the $\psi$ value is of the order of $1.88 \times 10^{-3}$ (kJ/mole/degree) for poly(isobutyl ether) and $1.84 \times 10^{-3}$ (kJ/mole/degree) for poly (ethyl ethylene).

Poly(alkyl ethylenes) with an H structure are macromers of the structure

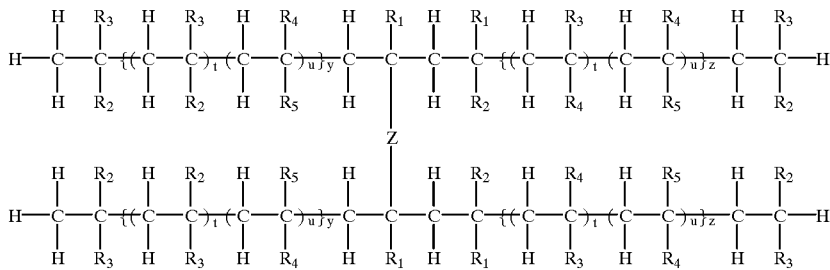

wherein $R_1 = C_1$ to $C_4$ alkyl, $R_2 = H$, $t/u = 0.03$ to 30, $R_3 = C_1$ to $C_4$ alkyl or H, $R_4 = H$, $C_1$ to $C_4$ alkyl, halogen or aryl, particularly phenyl, $R_5 = H$ or $C_1$ to $C_4$ alkyl and $y+z = 150$ to $3{,}000$.

$\Xi$ = polymeric bridging segments comprising acrylic acid, $C_4$ to $C_{12}$ acrylic acid derivatives, $C_3$ to $C_{21}$ allyl compounds, $C_8$ to $C_{14}$ diacrylates, $C_7$ to $C_{16}$ diallyl compounds, $C_4$ to $C_{10}$ dienes, $C_9$ to $C_{15}$ dimethacrylates, $C_7$ to $C_{10}$ divinyl compounds, $C_3$ to $C_{16}$ monovinyl compounds, $C_{12}$ to $C_{17}$ polyacrylates, $C_{15}$ to $C_{21}$ polymethacrylates, $C_9$ to $C_{12}$ triallyl compounds and/or macromers comprising oligobutadienes, polysiloxanes and/or polyethers.

Poly(alkyl ethylenes) with a Y structure are macromers having the structure

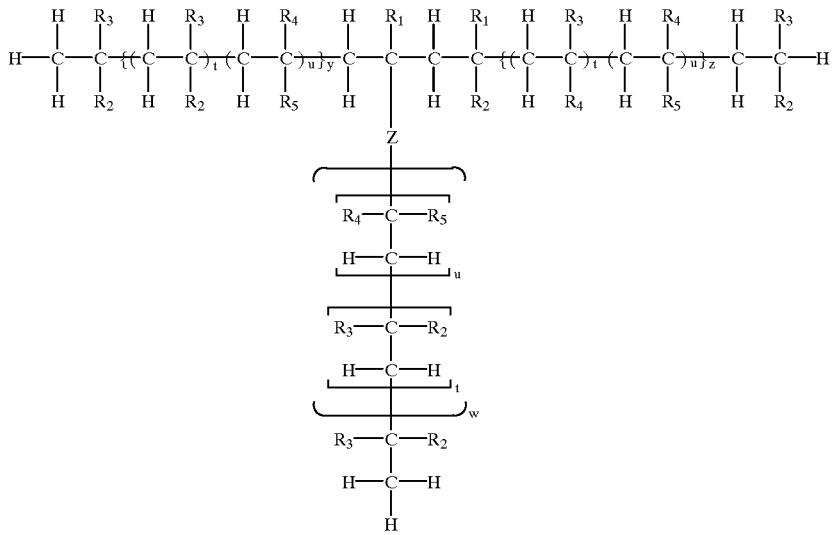

in which $R = C_1$ to $C_4$ alkyl, $R_2 = H$, $R_3 = C_1$ to $C_4$ alkyl or H, $R_4 = H$, $C_1$ to $C_4$ alkyl, halogen or aryl, particularly phenyl, $R_5 = H$ or $C_1$ to $C_4$ alkyl, $y+z = 150$ to $3{,}000$, $t/u = 0.03$ to 30 and $w = 250$ to $5{,}000$.

$\Xi$ = polymeric bridging segments based on acrylic acid, $C_4$ to $C_{12}$ acrylic acid derivatives, $C_3$ to $C_{21}$ allyl compounds, $C_8$ to $C_{14}$ diacrylates, $C_7$ to $C_{16}$ diallyl compounds, $C_4$ to $C_{10}$ dienes, $C_9$ to $C_{15}$ dimethacrylates, $C_7$ to $C_{10}$ divinyl compounds, $C_3$ to $C_{16}$ monovinyl compounds, $C_{12}$ to $C_{17}$ polyacrylates, $C_{15}$ to $C_{21}$ polymethacrylates, $C_9$ to $C_{12}$ triallyl compounds and/or macromers based on oligobutadienes, polysiloxanes and/or polyethers.

The proportion of polymeric bridging elements in the poly(alkyl ethylenes) with H and Y structures is 0.1 to 5% by weight.

Due to the structural isomerization of poly(alkyl ethylenes) to structurally isomeric poly(alkyl ethers) with H and Y structures, a chain arrangement, which greatly decreases the melt instability of the poly(alkyl ethylenes), is achieved in the melt.

Poly(alkyl ethylenes) with an H and a Y structure are preferred, in which $R_1$ and $R_3$ are formed by ethyl, methyl or isobutyl groups, $R_2$ and $R_5$ are formed by H and $R_4$ is formed by ethyl, n-butyl, methyl or isobutyl groups or by H or Cl.

Mixtures of these structurally isomeric poly(alkyl ethylenes) also have these inventive properties. Preferred $\psi$ values lie between $2.5 \times 10^{-3}$ and $6 \times 10^{-3}$ (kJ/mole/degree).

Suitable monovinyl compounds for the bridging segments $\Xi$ are p-acetoxystyrene, aminostyrene, t-butylstyrene, bromostyrene, chlorostyrene, dichlorostyrene, m-diethylaminoethylstyrene, diethylene glycol monovinyl ether, dimethoxystyrene, dimethylstyrene, ethoxystyrene, ethylstyrene, ethyl vinyl acetate, ethyl vinyl ether, ethylvinylpyridine, fluorostyrene, 2-hydroxybutylstyrene, 2-hydroxypropylstyrene, m-hydroxystyrene, isopropylstyrene, methoxystyrene, methyl-chlorostyrene, α-methylstyrene, m-methylstyrene, p-methylstyrene, methyl vinyl acetate, methyl vinyl ether, methylvinylpyridine, 4-phenoxystyrene, phenyl vinyl ether, styrene, trimethoxystyrene, trimethylstyrene, vinyl acetate, vinyl acetoxy methyl ketone, vinyl adipate, 9-vinyl anthracene, vinyl benzoate, vinyl butyl ether, vinyl butyl ketone, vinyl butyrate, vinyl carbazole, vinyl cyanoacetate, vinyl dodecyl ether, vinyl ether, vinylethyldiethoxysilane, vinyl ethyl ether, vinyl ethylene glycol glycidyl ether, vinyl ethylhexyl ether, vinyl ethyl ketone, vinyl formate, vinylfuran, vinyl hexyl ether, vinylimidazole, vinyl isobutyl ether, vinyl isocyanate, vinyl isopropyl ether, vinyl isopropyl ketone, vinyl laurate, vinylmethyldiacetoxysilane, vinylmethyldiethoxy-silane, vinyl methyl ether, vinyl methyl ketone, vinylnaphthalene, vinyl octadecyl ether, vinyl octyl ether, N-vinyloxazolidone, vinyl pelargonate, o-vinylphenol, vinyl-phenyldimethylsilane, vinyl phenyl ether, vinyl phenyl ketone, 5-vinylpicoline, vinyl propionate, N-vinylpyridine, N-vinylpyrrolidone, vinyl stearate, vinyltriethoxysilane, vinyltrimethoxysilane, vinyl-tris(trimethoxysiloxy)silane and/or vinyltrimethylsilane in amounts of 1.5% to 5% by weight.

Suitable as divinyl compounds for the polymeric bridging segments Ξ are divinylaniline, m-divinylbenzene, p-divinylbenzene, diethylene glycol divinyl ether, divinylpentane, divinylpropane and/or 1,3-divinyl-1,1,3,3-tetramethyldisiloxane in amounts of 0.1% to 2% by weight.

Polymeric bridging segments Ξ comprising allyl compounds include monomeric units such as allyl acetate, allyl acrylate, allyl alcohol, allylbenzene, allyl benzyl ether, 3-allyl-1-butene, allyl butyl ether, allyl cyanurate, allylcyclohexane, allyl diethyl ketone, 4-allyl-2,6-dimethoxyphenol, allyldimethylchlorosilane, allyl epoxy propyl ether, allyl ethyl ether, allyl glycidyl ether, allyl glycidyl hexyl hydrophthalate, allyl glycidyl phthalate, allyl heptanoate, allyl hexanoate, allyl methacrylate, allylmethoxyphenol, allyl methyl ether, allyl methyl maleate, allyloxy-2,3-propylene glycol, N-allyl stearamide, allyl tolyl ether, allyltrichlorosilane, allyltriethoxysilane, allyltrimethoxysilane, allyltrimethylsilane, allyltriphenylsilane and/or allyl vinyl ether in amounts of 0.2% to 4.5% by weight, based on the inventive poly(alkyl ethylenes) with H and Y structures.

Diacrylates or dimethacrylates suitable for the polymeric bridging segments Ξ are ethylene glycol diacrylate, propylene glycol diacrylate, trimethylene glycol diacrylate, butylene glycol diacrylate, dihydroxypentane diacrylate, dihydroxyhexane diacrylate, dihydroxyoctane diacrylate, diglycol diacrylate and/or triglyol diacrylate and dimethacrylates such as ethylene glycol dimethacrylate, propylene glycol dimethacrylate, trimethylene glycol dimethacrylate, butylene glycol dimethacrylate, dihydroxypentane dimethacrylate, dihydroxyhexane dimethacrylate, dihydroxyoctane dimethacrylate, diglycol dimethacrylates and/or triglycol dimethacrylate in amounts of 0.1% to 1.6% by weight.

Glycerin triacrylate, trimethylolpropane triacrylate and/or penta-erythritol tetraacrylate, in amounts of 0.1% to 1.2% by weight, are suitable as polyacrylates for the polymeric bridging segments Ξ.

Aside from polymeric bridging segments Ξ comprising acrylic acid, polymeric bridging segments Ξ preferably have acrylic acid derivatives, such as acrylamide, acrylonitrile, benzyl acrylate, butyl acrylate, cyclohexyl acrylate, N,N-dimethylacrylamide, dodecyl acrylate, ethyl acrylate, 2-ethylhexyl acrylate, 2-ethoxyethyl acrylate, glycidyl acrylate, hydroxyethyl acrylate, isopropyl acrylate, 2-methoxyethyl acrylate, 4-methoxybenzyl acrylate, methyl acrylate, sodium acrylate, N-t-butoxycarbonyl-2-aminoethyl acrylate, octyl acrylate, phenylmethyl acrylate, phenyl acrylate, n-propyl acrylate and/or tetrahydrofurfuryl acrylate, in amounts of 0.2% to 1.8% by weight, based on the inventive poly(alkyl ethylenes) with H and Y structures.

As diallyl compounds for the polymeric bridging segments Ξ, diallyldimethylsilane, diallyl(2-hydroxy-3-phenoxypropyl) isocyanurate, diallyl cyanurate, diallylcyanoethyl isocyanurate, diallyl cyanamide, diallyl maleate, diallylmelamine, diallyl phthalate and/or N,N'0 diamide of diallyltartaric acid in amounts of 0.2% to 1.8% by weight are suitable.

Polymeric bridging segments Ξ comprising dienes include monomeric units, such as butadiene, butadiene-1-carboxylic acid, chloroprene, 1,3-cyclohexadiene, 1,5-cyclohexadiene, cyclopentadiene, 2,3-dimethylbutadiene, 1-ethoxybutadiene, 1,4-heptadiene, 1,4-hexadiene, 1,6-hexadiene, isoprene, norbornadiene and/or 1,4-pentadiene in amounts of 0.1% to 1.6% by weight, based on the inventive poly(alkyl ethylenes) with H and Y structures.

Preferred polymeric bridging segments Ξ, comprising polymethacrylates include monomeric units such as glycerin trimethacrylate, trimethylolpropane trimethacrylate and/or pentaerythritol methacrylate in amounts of 0.1% to 1.2% by weight.

As triallyl compounds for polymeric bridging segments Ξ, triallyl citrate, triallyl cyanurate, triallyl isocyanurate and/or triallyl phosphine, in amounts of 0.1% to 1.4% by weight, are suitable.

Suitable macromers for polymeric bridging segments Ξ comprise oligobutadienes, polysiloxanes and/or polyethers with terminal acrylic, allyl, isocyanate, oxazoline or vinyl groups, in amounts of 0.8% to 5% by weight, based on the inventive poly(alkyl ethylenes) with H and Y structures.

Pursuant to the invention, mixtures of 3% to 97% of poly(alkyl ethylenes) with H and Y structures, 97% to 3% of unmodified poly(alkyl ethylenes), 0.001% to 2.5% of stabilizers and optionally 0.1% to 1% of antistatic materials, 0.2% to 3% of pigments, 0.05% to 1% of nucleating agents, 5% to 40% of fillers, 2% to 20% of flame retardants and/or 0.001% to 1% of processing aids also have a better processability than do unmodified poly(alkyl ethylenes); the Y index for these mixtures is of the order of $2 \times 10^{-3}$ to $7.8 \times 10^{-3}$ (kJ/mole/degree).

As stabilizers, preferably mixtures of 0.01% to 0.6% by weight of phenolic antioxidants, 0.01% to 0.6% of processing stabilizers based on phosphites, 0.01% to 0.6% of high-temperature stabilizers based on disulfides and thioethers and 0.01% to 0.8% of sterically hindered amines (HALS) are used.

Suitable phenolic antioxidants are 2-t-butyl-4,6-dimethylphenol, 2,6-di-t-butyl-4-methylphenol, 2,6-di-t-butyl-4-isoamylphenol, 2,6-di-t-butyl-4-ethylphenol, 2-t-butyl-4,6-diisopropylphenol, 2,6dicyclopentyl-4-methylphenol, 2,6-di-t-butyl-4-methoxymethylphenol, 2-t-butyl-4,6-dioctadecylphenol, 2,5-di-t-butylhydroquinone, 2,6-di-t-butyl-4,4-hexadecyloxyphenol, 2,2'-methylene-bis (6-t-butyl-4-methylphenol), 4,4'-thio-bis-(6-t-butyl-2-methylphenol), octadecyl 3(3,5-di-t-butyl-4-hydroxyphenyl-propionate, 1,3,5-trimethyl-2,4,6-tris(3',5'-di-t-butyl-4-hydroxybenzyl)benzene and/or pentaerythritol tetrakis(3-(3,5-di-t-butyl-4-hydroxyphenyl) propionate.

As HALS compounds, bis-2,2,6,6-tetramethyl-4-piperidyl sebacate and/or poly((1,1,3,3-tetramethylbutyl)-imino)-1,3,5-triazine-2,4,diyl)(2,2,6,6-tetramethylpiperidyl)-amino)-hexamethylene-4-(2,2,6,6-tetramethyl)piperidyl)-imino) are particularly suitable.

As processing aids, calcium stearate, magnesium stearate and/or waxes can be used.

Pursuant to the invention, structurally isomeric poly(alkyl ethylenes) are synthesized either according to an irradiation method or according to a melt reaction method or according to a solid phase reaction method.

For the irradiation, the powdery mixtures of 95% to 99.98% by weight of poly($C_1$ to $C_4$ alkyl ethylenes) and 0.02% to 5% by weight of acrylic acid, acrylic acid derivatives, allyl compounds, diacrylates, diallyl compounds, dienes, dimethacrylates, divinyl compounds, macromers with terminal acrylic, allyl, isocyanate, oxazoline or vinyl groups based on oligobutadienes, polysiloxanes or polyethers, monovinyl compounds, polyacrylates, polymethacrylates and/or triallyl compounds are exposed pursuant to the invention in a fluidized bed preferably under inert conditions, at 300° to 500° K. This takes place optionally in the presence of additional conventional auxiliary materials, particularly of 0.01% to 0.6% by weight of phenolic antioxidants, 0.01% to 0.6% by weight of high-temperature stabilizers based on disulfides and polyethers, 0.01 to 0.6% of processing stabilizers based on phosphites and/or 0.01% to 0.6% of sterically hindered amines (HALS), 0.1% to 1% of antistatic agents, 0.2% to 3% pigments, 0.05% to 1% of nucleating agents, 5% to 40% of fillers, 2% to 20% of flame retardants and/or 0.001% to 1% of processing aids. The irradiation process includes the following steps:

a) A first step of the reaction takes place preferably in fluidized bed reactors with continuous feeding of starting materials and discharging of reaction products. It uses an ionizing radiation having an energy of 150 to 10,000 KeV at an irradiation dose of 0.5 to 80 KGy. This is accomplished by, for example, nuclide irradiation equipment with cobalt 60 as radiation source, electron beam accelerators of the Cockcroft-Walton type with radiation energies of 300 to 4500 KeV or by electron beam accelerators of the linear accelerator type with beam current energies of 1,000 to 10,000 KeV.

b) A second step of the reaction includes a thermal treatment of the irradiated, powdery mixtures at 380° to 550° K. This can take place in, for example, extruders at temperatures ranging from 410° to 550° K. and at reaction times of 2 to 10 minutes or in the solid phase at temperatures ranging from 380° to 500° K. at reaction times from 5 to 60 minutes. It is possible to add, in addition, conventional stabilizers in concentrations of 0.01% to 0.6% before the thermal treatment.

For the melt reaction method, poly($C_1$ to $C_4$ alkyl ethylenes) are caused to react by a continuous method in the extruder, preferably under inert conditions. The melt reaction method includes the following steps:

a) A first step of the reaction employs 0.01% to 3% by weight of acyl peroxides, alkyl peroxides, hydroperoxides and/or peresters, which are either drummed up on the poly(alkyl ethylenes) in the kneader and metered together or metered as a solution into the poly(alkyl ethylene) melt in zones 2 to 4 of the extruder.

b) In the second step of the reaction, 0.01% to 5% by weight of acrylic acid or acrylic acid derivatives, allyl compounds, diacrylates, diallyl compounds, dienes, dimethacrylates, divinyl compounds, macromers with terminal acrylic, allyl, isocyanate, oxazoline or vinyl groups and based on oligobutadienes, polysiloxanes or polyethers, monovinyl compounds, polyacrylates, polymethacrylates and/or triallyl compounds, are caused to react in the presence of 0.001% to 3.0% by weight of acyl peroxides, alkyl peroxides, hydroperoxides and/or peresters. The reaction optionally takes place in the presence of conventional auxiliary materials, particularly 0.01 to 0.6% by weight of phenolic antioxidants, 0.01% to 0.6% by weight of high-temperature stabilizers based on disulfides and polyethers, 0.01% to 0.6% of processing stabilizers based on phosphites and/or 0.01% to 0.8% of sterically hindered amines (HALS), 0.1% to 1% of antistatic agents, 0.2% to 3% of pigments, 0.05% to 1% of nucleating agents, 5% to 40% of fillers, 2 to 20% of flame retardants and/or 0.001% to 1% of processing aids at temperatures of 140° to 320° C. The radical-forming agents and the monomers are metered in over separate metering equipment and/or jointly as a solution into the poly(alkyl ethylene) melt in zones 3 to 6 of the extruder, optionally with a further portion of poly(alkyl ethylene).

The solid-phase continuous method occurs preferably under inert conditions. The following steps are employed in the solid phase as a continuous method:

a) Powdery poly($C_1$ to $C_4$ alkyl ethylenes) are subjected, pursuant to the invention, in a first step of the method at 290° to 500° K. in reactors with rotating equipment and circulating carrier gas, to a sorption with 0.05 to 3% by weight of acyl peroxides, alkyl peroxides, hydroperoxides and/or peresters as well as 0.05% to 5% by weight of acrylic acid, acrylic acid derivatives, allyl compounds, diacrylates, diallyl compounds, dienes, dimethacrylates, divinyl compounds, monovinyl compounds, polyacrylates, polymethacrylates and/or triallyl compounds, which were introduced over vaporizing equipment into the carrier-gas stream.

b) The powdery mixtures, in a second step of the method, optionally with the addition of conventional auxiliary materials, particularly of 0.01% to 2.5% of stabilizers, 0.1% to 1% of antistatic agents, 0.2% to 3% of pigments, 0.05% to 1% of nucleating agents, 5% to 40% of fillers, 2% to 20% of flame retardants and/or 0.001% to 1% of processing aids, are heated in the feed region of the screw injection molding machine, particularly twin-screw extruders or single-screw extruders with plunger screw, to the decomposition temperature of the radical-forming agent and subsequently melted at reaction temperatures of 415° to 596° K. and granulated.

As poly(alkyl ethylenes), preferably poly(ethyl ethylenes) with glass transition temperatures of 242° to 250° K. and molecular weights ($M_w$) ranging from $2 \times 10^4$ to $3 \times 10^6$, poly(ethyl ethylene co-ethylene) copolymers, containing 3 to 45 mole percent of ethylene in the copolymer, poly(ethyl ethylene co-methylethylene) copolymers containing 3 to 97 mole percent of methylethylene in the copolymer, poly (isobutylenes) with glass transition temperatures of 295° to 303° K. and densities ranging from 0.813 to 0.832 g/cc at 25° C., poly(isobutyl ethylene co-n-butylethylene) copolymers with an n-butylethylene portion of 3 to 97 mole percent, poly(isobutyl ethylene) copolymers with an ethylene portion in the copolymer of 3 to 45 mole percent, poly(methyl ethylenes) with glass transition temperatures ranging from 259° to 268° K. and molecular weights ($M_w$) ranging from $1 \times 10^5$ to $8 \times 10^6$ and/or poly(methyl ethylene co-ethylene) copolymers with an ethylene potion in the copolymer of 3 to 45 mole percent, are used.

Examples of the peroxides used are:

acyl peroxides, such as benzoyl peroxide, 4-chlorobenzoyl peroxide, 3-methoxybenzoyl peroxide and methylbenzoyl peroxide;

alkyl peroxides, such as acetyl peroxide, allyloxypropionyl peroxide, allyl-t-butyl peroxide, benzoyl peroxide, 2,2-bis(t-butylperoxybutane), 1,1-bis-(t-butylperoxy)-3,3,5-trimethylcyclohexane, n-butyl-4,4,bis(t-butylperoxy) valerate, diisopropyl-aminomethyl-t-amyl peroxide, d-methylaminomethyl-t-amyl peroxide, diethyl-aminomethyl-t-butyl peroxide, dimethylaminomethyl-t-butyl peroxide, dinitrobenzoyl peroxide, 1,1-di-(t-amylperoxy)cyclohexane, methoxybenzoyl peroxide, methylbenzoyl peroxide, t-amyl peroxide, t-butylcumyl peroxide, t-butylpermaleic acid, t-butyl peroxide, 1-hydroxybutyl-n-butyl peroxide and/or succinoyl peroxide;

hydroperoxides, such as decalin hydroperoxide and/or tetralin hydroperoxide;

ketone peroxides, such as methyl ethyl ketone hydroperoxide;

peresters and peroxycarbonates, such as butyl peracetate, cumyl peracetate, cumyl perpropionate, cyclohexyl peracetate, di-t-butyl peradipate, di-t-butyl perazelate, di-t-butyl perglutarate, di-t-butyl perphthalate, di-t-butyl persebacate, 4-nitrocumyl perpropionate, 1-phenylethyl perbenzoate, phenylethylnitroperbenzoate, t-butyl-bicyclo-(2,2,1) heptapercarboxylate, t-butyl-4-carbomethoxy perbutyrate, t-butyl-cyclobutane percarboxylate, t-butylcyclohexyl peroxycarboxylate, t-butylcyclopentyl percarboxylate, t-butylcyclopropane percarboxylate, t-butyldimethyl percinnamate, t-butyl-2-(2,2-diphenylvinyl perbenzoate, t-butyl-4-methoxy perbenzoate, t-butyl perbenzoate, t-butylcarboxycyclohexane, t-butyl pernaphthoate, t-butyl peroxyisopropyl carbonate, t-butyl pertoluate, t-butyl-1-phenylcyclopropyl percarboxylate, t-butyl-2-propyl 2-perpentenoate, t-butyl-1-methylcyclopropyl percarboxylate, t-butyl-4-nitrophenyl peracetate, t-butylnitrophenyl peroxycarbamate, t-butyl-N-succinimido percarboxylate, t-butyl percrotonate, t-butyl permaleate, t-butyl permethacrylate, t-butyl peroctoate, t-butyl peroxyisopropylcarbonate, t-butyl perisobutyrate, t-butyl peracrylate and/or t-butyl perpropionate.

Examples of the monomers used are:

acrylic acid derivatives, such as acrylamide, acrylonitrile, benzyl acrylate, butyl acrylate, cyclohexyl acrylate, N,N-dimethylacrylamide, dodecyl acrylate, ethyl acrylate, 2-ethylhexyl acrylate, 2-ethoxyethyl acrylate, glycidyl acrylate hydroxy-ethyl acrylate, isopropyl acrylate, 2-methoxyethyl acrylate, 4-methoxybenzyl acrylate, methyl acrylate, sodium acrylate, N-t-butoxycarbonyl-2-aminoethyl acrylate, octyl acrylate, phenylmethyl acrylate, phenyl acrylate, n-propyl acrylate and/or tetrahydrofurfuryl acrylate;

diallyl compounds, such as diallyldimethylsilane, diallyl (2-hydroxy-3-phenoxy-propyl) isocyanurate, diallyl cyanurate, diallylcyanoethyl isocyanurate, diallyl cyanamide, diallyl maleate, diallylmelamine, diallyl phthalate and/or N,N'-diallyl tartaramide;

dimethacrylates, such as ethylene glycol dimethacrylate, propylene glycol dimethacrylate, trimethylene glycol dimethacrylate, butylene glycol dimethacrylate, dihydroxypentane dimethacrylate, dihydroxyhexane dimethacrylate, dihydroxy-octane dimethacrylate, diglycol dimethacrylate and/or triglycol dimethacrylate;

dienes, such as butadiene, butadiene-1-carboxylic acid, chloroprene, cyclohexadiene, cyclopentadiene, 2,3-dimethylbutadiene, 1-ethoxy butadiene, 1,4-heptadiene, 1,4-hexadiene, 1,6-hexadiene, isoprene, norbornadiene and/or pentadiene;

polymethacrylates, such as glycerin trimethacrylate, trimethylolpropane trimethacrylate and/or pentaerythritol tetramethacrylate;

triallyl compounds, such as triallyl citrate, triallyl cyanurate, triallyl isocyanurate and/or triallylphosphene; monovinyl compounds, such as acetoxystyrene, aminostyrene, t-butylstyrene, bromostyrene, chlorostyrene, dichlorostyrene, m-diethylaminoethylstyrene, diethylene glycol monovinyl ether, dimethoxystyrene, dimethylstyrene, ethoxystyrene, ethylstyrene, ethylvinyl acetate, ethylvinyl ether, ethylvinyl-pyridine, fluorostyrene, 2-hydroxybutylstyrene, 2-hydroxypropylstyrene, m-hydroxystyrene, isopropylstyrene, methoxystyrene, methylchlorostyrene, α-methylstyrene, m-methylstyrene, p-methylstyrene, methylvinylacetyl, methylvinyl ether, methylvinylpyridine, 4-phenoxystyrene, phenylvinyl ether, styrene, trimethoxy styrene, trimethylstyrene, vinyl acetate, vinyl acetoxymethyl ketone, vinyl adipate, 9-vinylanthracene, vinyl benzoate, vinyl butyl ether, vinyl butyl ketone, vinyl butyrate, vinylcarbazol, vinylcyanoacetate, vinyl dodecyl ether, vinyl ether, vinylethoxydiethoxysilane, vinyl ethyl ether, vinyl ethylene glycol glycidyl ether, vinyl ethylhexyl ether, vinyl ethyl ketone, vinyl formate, vinyl furan, vinyl hexyl ether, vinylimidazole, vinyl isobutyl ether, vinyl isocyanate, vinyl isopropyl ether, vinyl isopropyl ketone, vinyl laurate, vinylmethyldiacetoxysilane, vinylmethyldiethoxysilane, vinyl methyl ether, vinyl methyl ketone, vinylnapthalene, vinyl octadecyl ether, vinyl octyl ether, N-vinyloxazolidone, vinyl pelargonate, o-vinylphenol, vinylphenyldimethylsilane, vinyl phenyl ether, vinyl phenyl ketone, 5-vinylpicoline, vinyl propionate, N-vinylpyridine, N-vinylpyrrolidone, vinyl stearate, vinyltriethoxysilane, vinyltrimethoxysilane, vinyl-tris (trimethoxysiloxy)silane and/or vinyltrimethylsilane;

divinyl compounds, such as divinylaniline, m-divinylbenzenes, p-divinylbenzenes, diethylene glycol divinyl ether, divinylpentane, divinylpropane and/or 1,3-divinyl-1,1,3,3,-tetramethyldisiloxane;

allyl compounds, such as allyl acetate, allyl acrylate, allyl alcohol, allylbenzene, allyl benzyl ether, 3-allyl-1-butene, allyl butyl ether, allyl cyanurate, allycyclohexane, allyl diethyl ketone, 4-allyl-2,6-dimethoxyphenol, allyldimethylchloro-silane, allyl epoxypropyl ether, allyl ethyl ether, allyl glycidyl ether, allyl glycidyl hexahydrophthalate, allyl glycidyl phthalate, allyl heptanoate, allyl hexanoate, allyl methacrylate, allylmethoxyphenol, allyl methyl ether, allyl methyl maleate, allyloxy-2,3-dihydroxypropane, N-allyl stearamide, allyl tolyl ether, allyltrichlorosilane, allyltriethoxysilane, allyltrimethoxysilane, allyltrimethylsilane, allyltriphenylsilane and/or allyl vinyl ether;

diacrylates, such as ethylene glycol diacrylate, propylene glycol diacrylate, trimethylene glycol diacrylate, butylene glycol diacrylate, dihydroxypentane diacrylate, dihydroxyhexane diacrylate, dihydroxyoctane diacrylate, diglycol diacrylate and/or triglycol diacrylate;

macromers, based on oligobutadienes, polysiloxanes and/or polyethers with terminal acrylic, allyl, isocyanate, oxazoline or vinyl groups.

As stabilizers, mixtures of 0.01% to 0.6% by weight of phenolic antioxidants, 0.01% to 0.6% of processing stabilizers comprising phosphites, 0.01% to 0.6% of high-temperature stabilizers comprising disulfides and thioethers and 0.01% to 0.8% of sterically hindered amines (HALS) are preferably used.

Suitable phenolic antioxidants are 2-t-butyl-4,6-dimethylphenol, 2,6-di-t-butyl-4-methylphenol, 2,6-di-t- butyl-4-isoamylphenol, 2,6-di-t-butyl-4-ethylphenol, 2-t-butyl-4,6-diisopropylphenol, 2,6-dicyclopentyl-4-methylphenol, 2,6-di-t-butyl-4-methoxymethylphenol, 2-t-butyl-4,6-dioctadecylphenol, 2,5-di-t-butylhydroquinone, 2,6-di-t-butyl-4,4-hexadecyloxyphenol, 2,2'-methylene-bis (6-t-butyl-4-methylphenol), 4,4'-thio-bis-(6-t-butyl-2-methylphenol), octadecyl 3(3,5-di-t-butyl-4-hydroxyphenol)propionate, 1,3,5-trimethyl-2,4,6-tris(3',5'-di-t-butyl-4-hydroxybenzyl)benzene and/or pentaerythritol tetrakis(3-(3,5-di-t-butyl-4-hydroxyphenyl))-propionate.

As HALS compounds, bis-2,2,6,6-tetramethyl-4-piperidyl sebacate and/or poly-((1,1,3,3-tetramethylbutyl)-imino)-1,3,5-triazine-2,4-diyl)(2,2,6,6-tetramethylpiperidyl)-amino)-hexamethylene-4-(2,2,6,6-tetramethyl)piperidyl)-imino) are particularly suitable.

For the irradiation method, the powdery mixtures are prepared from 95% to 99.98% by weight of poly(alkyl ethylenes) and 0.02% to 5% by weight of acrylic acid or acrylic acid derivatives, allyl compounds, diacrylates, diallyl compounds, dienes, dimethacrylates, divinyl compounds; macromers with terminal acrylic, allyl, isocyanate, oxazoline or vinyl groups and based on oligobutadienes, polysiloxanes and/or polyethers, monovinyl compounds, polyacrylates, polymethacrylates and/or triallyl compounds, preferably in kneaders, static mixers or fluidized bed reactors.

For the melt reaction method, twin-screw extruders with an L/D ratio of 30 to 45 are preferably used. Advantageous reaction temperatures for both steps of the reaction are 140° to 250° C. when poly(ethyl ethylene) homopolymers and copolymers are used, 165° to 270° C. when poly(methyl ethylene) homopolymers and copolymers are used and 240° to 310° C. when poly(isobutyl ethylene) homopolymers and copolymers are used.

For the solid phase reaction method, bunker supply bins are preferably suitable as reactors with rotating equipment and circulating carrier gas.

The inventive poly(alkyl ethylenes) with H and Y structures and a Y index of $2 \times 10^{-3}$ to $8 \times 10^{-3}$ (kJ/mole/degree), as well as the mixtures with unmodified poly(alkyl ethylenes), stabilizers, antistatic agents, pigments, nucleating agents, fillers, flame retardants and/or processing aids are preferably suitable for the production of films, sheets, coatings, pipes, hollow objects and foams.

The invention is explained by the following examples:

EXAMPLE 1

To a fluidized bed reactor with a capacity of 15 L, which is installed in gamma-irradiation equipment of the "gamma beam" type, 2,450 g of powdery poly(ethyl ethylene) homopolymer ($T_g$=248° K, $M_w$=8×10$^5$) are added and made inert by being fluidized with pure nitrogen. After the temperature is raised to 90° C., 8.5 g of styrene per hour are introduced for a period of 8 hours by means of the fluidizing gas into the reactor in the irradiation position (dose output of 0.55 KGy/hour). After the radiation sources are lowered, the modified poly(ethyl ethylene) is cooled to 25° C. under an inert gas, stabilized by metering in 0.35% of a mixture of 0.15% 2-t-butyl-4,6-dimethylphenol and 0.20% of bis-2,2,6,6-tetramethyl-4-piperidyl sebacate (as a 10% solution in acetone) and subjected to a thermal treatment at 162° C. (residence time: 4.8 minutes) by being extruded in a Werner & Pfleiderer twin-screw extruder of the ZSK 20 type in a second step of the reaction. The resulting structurally isomeric poly(ethyl ethylene) has a Y index of $2.3 \times 10^{-3}$ (kJ/mole/degree) and is present in H and Y structures, wherein $R_1=R_3=R_4=C_2H_5$ and $R_2=R_5=H$, y+z=345. The proportion of polymeric bridging elements, determined by IR spectroscopy, and comprising styrene, is 2.5% by weight.

EXAMPLE 2

To a fluidized bed reactor, similar to that of Example 1, 3280 g of powdery poly(ethyl ethylene co-ethylene) copolymer (with an ethylene content of 6 mole percent, a melt index of 3.5 g/10 minutes at 190° C./21, 19 N) are added and made inert by being fluidized with pure nitrogen. After the temperature is raised to 80° C., 2.5 g of allyl acrylate per hour are introduced for a period of 3.5 hours by means of the fluidizing gas into the reactor in the irradiation position (dose output of 0.55 KGy/hour). After the radiation sources are lowered, the modified poly(ethyl ethylene co-ethylene) is cooled to 25° C. under an inert gas, stabilized by metering in 0.45% of a mixture of 0.25% 2,6-di-t-butyl-4-methylphenol and 0.20% of bis-2,2,6,6-tetramethyl-4-piperidyl sebacate (as a 10% solution in acetone) and subjected to a thermal treatment at 166° C. (residence time: 4.2 minutes) by being extruded in a Werner & Pfleiderer twin-screw extruder of the ZSK 20 type in a second step of the reaction. The resulting structurally isomeric poly(ethyl ethylene co-ethylene) copolymer has a ψ index of $3.4 \times 10^{-3}$ (kJ/mole/degree) and is present in H and Y structures, wherein $R_1=R_3=C_2H_5$ and $R_2=R_4=R_5=H$, y+z=295. The proportion of polymeric bridging elements, determined by IR spectroscopy and comprising allyl acrylate, is 0.22% by weight; the t/u ratio is about 16.

EXAMPLE 3

Into a fluidized bed reactor, similar to that of Example 1, 3960 g of a poly(isobutyl ethylene) homopolymer ($T_g$=300° K, $M_w$=6×10$^5$) are metered and made inert by being fluidized with pure nitrogen. After the temperature is raised to 140° C., 4.9 g of glycidyl acrylate per hour are introduced for a period of 5.3 hours by means of the fluidizing gas into the reactor in the irradiation position (dose output of 0.55 KGy/hour). After the radiation sources are lowered, the modified poly(isobutyl ethylene) is kept for a further hour at 140° C. under an inert gas and cooled to 25° C. and stabilized by metering in 0.40% of a mixture of 0.20% 2-t-butyl-4,6-dioctadecylphenol and 0.20% of bis-2,2,6,6-tetramethyl-4-piperidyl sebacate (as a 10% solution in acetone). The resulting structurally isomeric poly(isobutyl ethylene) has a ψ index of $3.2 \times 10^{-3}$ (kJ/mole/degree) and is present in H and Y structures, wherein $R_1=R_3=R_4=i-C_4H_9$ and $R_2=R_5=H$, y+z=173. The proportion of polymeric bridging elements, determined by IR spectroscopy and comprising glycidyl acrylate, is 0.58% by weight.

EXAMPLE 4

In a kneader under nitrogen, 0.15% of 2,6-dicyclopentyl-4-methylphenol, 0.15% of bis-2,2,6,6-tetramethyl-4-piperidyl sebacate and 3.2% of t-butyl acrylate are drummed up on a poly(ethyl ethylene) homopolymer ($T_g$=248° K., $M_w$=4×10$^5$). The powdery mixture is irradiated in a fluidized bed reactor with a Cockroft-Walton type electron beam accelerator with a radiation energy at 3,500 KeV of 2×35 KW. The two beam-emerging windows of the scanner are integrated in the narrow side surfaces of the fluidized bed reactor (capacity 0.3 m$^3$, bottom, against which there is a flow 0.95×0.20 m). At an irradiation temperature of 110° C., the powdery mixture is charged into and discharged out of the fluidized bed reactor continuously at a throughput of 0.5 kg/second and subsequently, in a second step of the reaction, subjected in a Werner & Pfleiderer ZSK. 120 twin-screw extruder under inert conditions to a thermal treatment at 165° C. (residence time 6.3 minutes). The resulting structurally isomeric poly(ethyl ethylene) homopolymer has a ψ index of $3.2 \times 10^{-3}$ (kJ/mole/degree) and exists in H and Y structures, with $R_1=R_3=R_5=C_2H_5$, $R_2=R_4=H$ and y+z=310 and w=620. The proportion of polymeric bridging elements, comprising t-butyl acrylate, is 2.65%.

EXAMPLE 5

In a kneader under nitrogen, 0.31% of 2,6-di-t-butyl-4-methoxy-methylphenol, 0.15% of bis-2,2,6,6-tetramethyl-4-piperidyl sebacate and 0.35% of divinylbenzene are drummed up on poly(methyl ethylene) homopolymer ($T_g$=263° K, $M_w=6 \times 10^5$). The powdery mixture is irradiated in the 0.3 m³ fluidized bed reactor with the electron beam accelerator of Example 4. At an irradiation temperature of 110° C., the powdery mixture is charged into and discharged out of the fluidized bed reactor continuously at a throughput of 1.5 kg/second and subsequently, in a second step of the reaction, subjected in a Werner & Pfleiderer ZSK 120 twin-screw extruder under inert conditions to a thermal treatment at 220° C. (residence time 4.9 minutes). The resulting structurally isomeric poly(methyl ethylene) has a ψ index of $4.1 \times 10^{-3}$ (kJ/mole/degree) and exists in H and Y structures, with $R_1=R_3=R_4=CH_3$, $R_2=R_5=H$ and y+z=540. The proportion of polymeric bridging elements, comprising divinylbenzene and determined by IR spectroscopy, is 0.32%.

EXAMPLE 6

In a kneader under nitrogen, 0.15% of 2,6-di-t-butyl-4-methoxy-methylphenol, 0.15% of bis-2,2,6,6-tetramethyl-4-piperidyl sebacate and 1.2% of vinyltrimethylsilane are drummed up on poly(ethyl ethylene co-phenylethylene) copolymer (phenylethylene content 5 mole percent, melt index 6.8 g/10 minutes at 190° C./21.19 N). The powdery mixture is irradiated in the 0.3 m³ fluidized bed reactor with the electron beam accelerator of Example 4. At an irradiation temperature of 65° C., the powdery mixture is charged into and discharged out of the fluidized bed reactor continuously at a throughput of 0.7 kg/second and subsequently, in a second step of the reaction subjected in a Werner & Pfleiderer ZSK 120 twin-screw extruder under inert conditions to a thermal treatment at 170° C. (residence time 5.2 minutes). The resulting structurally isomeric poly(ethyl ethylene co-phenylethylene) copolymer has a ψ index of $3.7 \times 10^{-3}$ (kJ/mole/degree) and exists in H and Y structures, with $R_1=R_3=C_2H_5$, $R_2=R_5=H$, $R_4=C_2H_5$ and y+z=215. The proportion of polymeric bridging elements, comprising vinyltrimethylsilane and determined by IR spectroscopy, is 0.95% and the t/u ratio is about 19.

EXAMPLE 7

In a kneader under nitrogen, 0.6% of allyl methacrylate is drummed up on poly(isobutyl ethylene co-ethylene) copolymer (ethylene content 8 mole percent, melt index 0.8 g/10 minutes at 230° C.). The powdery mixture is irradiated in a fluidized bed reactor equipped with a linear electron accelerator equipped with 3 scanners (with a beam current energy of 8,000 KeV and a beam power of 3×5 KW). The bottom of the fluidized bed reactor (capacity of 0.94 m³), against which there is flow, has the shape of an equilateral triangle with a side length of 1.3 m. Beam-emerging windows of the scanner are integrated in the three side surfaces. At an irradiation temperature of 175° C., the powdery mixture is charged into and discharged out of the fluidized bed reactor continuously at a throughput of 40 kg/minute and subsequently, in a second step of the reaction, with addition of 0.15% of 2,6-di-t-butyl-4-methoxy-methylphenol and 0.15% of bis-2,2,6,6-tetramethyl-4-piperidyl sebacate, subjected in a Werner & Pfleiderer ZSK 120 twin-screw extruder under inert conditions to a thermal treatment at 255° C. (residence time 4.2 minutes). The resulting structurally isomeric poly(isobutyl ethylene co-ethylene) copolymer has a ψ index of $3.4 \times 10^{-3}$ (kJ/mole/degree) and exists in H and Y structures, with $R_1=R_3=i-C_4H_9$, $R_2=R_5=R_4=H$ and y+z=250. The proportion of polymeric bridging elements, comprising allyl methacrylate and determined by IR spectroscopy, is 0.56% and the t/u ratio is about 11.5.

EXAMPLE 8

In a kneader under nitrogen, 0.25% of glycerin trimethacrylate and 0.65% of behenic acid are drummed up on poly(methyl ethylene co-ethylene) copolymer (ethylene content of 7%, $M_w=3.5 \times 10^{-5}$). The powdery mixture is irradiated in a fluidized bed reactor with the irradiating facilities of Example 7 at a throughput of 35 kg/minute and an irradiation temperature of 125° C. After the addition of 0.2% of 4,4'-thio-bis-(6-t-butyl-2-methylphenol) and 0.15% of poly-(1,1,3,3-tetramethylbutyl)-imino)-1,3,5-triazine-2,4-diyl)(2,2,6,6-tetramethylpiperidyl)-amino)-hexamethylene-4-(2,2,6,6-tetramethyl)piperidyl)-imino), the powdery mixture, in a second step of the reaction, is subjected in a Werner & Pfleiderer ZSK 120 twin-screw extruder under inert conditions to a thermal treatment at 215° C. (residence time 4.6 minutes). The resulting structurally isomeric poly(methyl ethylene co-ethylene) copolymer has a ψ index of $4.4 \times 10^{-3}$ (kJ/mole/degree) and exists in H and Y structures, with $R_1=R_3=CH_3$, $R_2=R_4=R_5=H$, and y+z=350. The proportion of polymeric bridging elements, comprising glycerin trimethacrylate, is 0.95% and the t/u ratio is about 0.24.

EXAMPLE 9

In a kneader under nitrogen, 0.32% of allyl glycidyl phthalate are drummed up under nitrogen on powdery poly(ethyl ethylene co-methylene) copolymer (methylene content of 92 mole percent, melt index 1.8 g/10 min at 230° C./21.19 N). The powdery mixture is irradiated in a fluidized bed reactor with the irradiating facilities of Example 7 at a throughput of 37 kg/minute and an irradiation temperature of 125° C. After the addition of 0.2% of 4,4'-thio-bis-(6-t-butyl-2-methylphenol) and 0.15% of poly-((1,1,3,3-tetramethylbutyl)-imino)-1,3,5-triazine,2,4-diyl)-(2,2,6,6,-tetra-methylpiperidyl)-amino)-hexamethylene-4-(2,2,6,6-tetramethyl)piperidyl)-imino), the powdery mixture, in a second step of the reaction, is subjected in a Werner & Pfleiderer ZSK 120 twin-screw extruder under inert conditions to a thermal treatment at 205° C. (residence time 4.8 minutes). The resulting structurally isomeric poly(ethyl ethylene co-methylene) copolymer has a Y index of $4.1 \times 10^{-3}$ (kJ/mole/degree) and exists in H and Y structures, with $R_1R_3=C_2H_5$, $R_2=R_5=H$, $R_4=CH_3$ and y+z=770. The proportion of polymeric bridging elements, comprising allyl glycidyl phthalate and determined by IR spectroscopy, is 0.30% by weight and the t/u ratio is about 0.08.

EXAMPLE 10

In a kneader under nitrogen, 0.22% of ethylene glycol diacrylate are drummed up on powdery poly(isobutyl ethylene co-n-butylethylene) copolymer (n-butylethylene content of 42 mole percent, melt index 0.9 g/10 min at 230°

C./49 N). The powdery mixture is conveyed pneumatically by inert gas into a 0.20×3.50 m² cassette reactor with 4 integrated cathodes of a low energy accelerator of the band beam type (with an electron energy of 250 KeV and a radiation output of 4×10 kW) and integrated vibration equipment. The throughput at an irradiation temperature of 160° C. is 43 kg/minute. After the addition of 0.18% of 2,6-di-t-butyl-4-methoxymethylphenol and 0.15% of bis-2, 2,6,6-tetramethyl-4-piperidyl sebacate, the powdery mixture, in a second step of the reaction, is subjected in a Werner & Pfleiderer ZSK 120 twin-screw extruder under inert conditions to a thermal treatment at 255° C. (residence time 5.3 minutes). The resulting mixture of unmodified and structurally isomeric poly(isobutylene ethylene co-n-butylethylene) copolymer has a Y index of $3.1 \times 10^{-3}$ (kJ/mole/degree). The structurally isomeric poly(alkyl ethylene) exists in H and Y structures, with $R_1=R_3=i-C_4H_9$, $R_2=R_5=H$, $R_4=n-C_4H_9$ and y+z=410. The proportion of polymeric bridging elements, comprising ethylene glycol diacrylate and determined by IR spectroscopy, is 0.21% by weight and the t/u ratio is about 1.4.

EXAMPLE 11

In a cassette reactor with radiation facilities of Example 10, a poly(methyl ethylene) homopolymer ($M_w=4.9\times10^5$, $T_g=265°$ K) is conveyed by means of a carrier gas of 97% pure nitrogen and 3% butadiene. The throughput of the fluidized bulk material layer at an irradiation temperature of 160° C. is 31 kg/minute. After the addition of 0.45% of 0.25% of 2,6-di-t-butyl-4-methylphenol and 0.20% of bis-2,2,6,6-tetramethyl-4-piperidyl sebacate, the powdery mixture, in a second step of the reaction, is subjected in a Werner & Pfleiderer ZSK 120 twin-screw extruder under inert conditions to a thermal treatment at 200° C. (residence time 5.1 minutes). The resulting mixture of structurally isomeric poly(methyl ethylene) and the unmodified poly (methyl ethylene) homopolymer has a $\psi$ index of $2.9\times10^{-3}$ (kJ/mole/degree) and an $M_n$ value of $7.7\times10^4$.

EXAMPLE 12

In a kneader under nitrogen, 3.9% of methyl methacrylate are drummed up on powdery poly(ethyl ethylene-co-chloroethylene) copolymer (chloroethylene content of 4 mole percent, melt index 3.2 g/10 min at 190° C./21.19 N) and conveyed pneumatically into the cassette reactor with radiation facilities of Example 10. The throughput of the fluidized bulk material layer at an irradiation temperature of 60° C. is 18 kg/minute. After the addition of 0.40% of a mixture of 0.25% 2,6-di-t-butyl-4-methylphenol and 0.15% of bis-2,2,6,6-tetramethyl-4-piperidyl sebacate, the powdery mixture, in a second step of the reaction, is subjected in a Werner & Pfleiderer ZSK 120 twin-screw extruder under inert conditions to a thermal treatment at 165° C. (residence time 5.9 minutes). The resulting mixture of unmodified and structurally isomeric poly(ethyl ethylene co-n-chloroethylene) copolymer has a $\psi$ index of $2.6\times10^{-3}$ (kJ/mole/degree). The modified poly(alkyl ethylene) exists in H and Y structures, with $R_1=R_3=i-C_4H_9$, $R_2=R_5=H$, $R_4=Cl$ and y+z=325. The proportion of polymeric bridging elements, comprising methyl methacrylate, is 3.1% by weight.

EXAMPLE 13

The structurally isomeric poly(ethyl ethylene) of Example 1 (40 parts) is mixed with 60 parts of unmodified poly(butyl ethylene), 0.23 parts of 2-t-butyl-4,6-dimethylphenol, 0.10 parts of behenic acid, 0.2 parts of calcium stearate and 0.20 parts of poly-((1,1,3,3-tetramethylbutylimino)triazine-2,4, diyl)-(2,2,6,6,-tetramethyl-piperidyl)-amino)-hexamethylene-4-(2,2,6,6-tetramethyl)piperidyl)imino) and homog-enized in the extruder at 140° /165° /175° /175° /170° /155° C. The resulting compound has a $\psi$ index of $2.7\times10^{-3}$ (kJ/mole/degree).

EXAMPLE 14

The structurally isomeric poly(alkyl ethylenes) of Examples 5, 8 and 9 (20 parts of each) are homogenized with 15 parts of an unmodified poly(methyl ethylene co-ethylene) copolymer having an ethylene content of 50%, 15 parts of an unmodified poly(ethyl ethylene co-methylethylene) copolymer having an ethylene content of 15%, 8 parts of talcum and 1 part of carbon black in the extruder at 140° /190° /230° /220° /220° /210° /200° C. The alloy has a Y index of $2.4\times10^{-3}$ (kJ/mole/degree).

EXAMPLE 15

The structurally isomeric poly(isobutyl ethylene co-ethylene) copolymer of Example 7 is extruded in the extruder with a fishtail die at 255° to 275° C. into panels. Milled out test pieces have the following characteristic values: tensile strength: 27 MPa, elongation at break: 18%, modulus of tension: 1.6 GPa, modulus of bending: 1.4 GPa. The corresponding characteristic values for the unmodified poly(isobutyl ethylene) are 23 MPa, 16%, 1.2 GPa and 1.1 GPa.

EXAMPLE 16

In a Werner & Pfleiderer ZSK 30 twin-screw extruder, L/D=42, with inert gas flow, vacuum degassing and strand granulation and having a temperature profile of 140° /170° /165° /190° /165° /190° /145°, a poly(ethyl ethylene) homopolymer ($T_g=248°$ K, $M_w 8\times10^5$) is metered at the rate of 16 kg/h. Into the melt in zone 3, a 20% solution of t-butyl perbenzoate in acetone is added at the rate of 0.64 L/h. In zone 5, vinyl trimethoxysilane, at a rate of 0.61 L/h, and a 20% solution of t-butyl perbenzoate in acetone, at a rate of 0.64 L/h, are metered in over separate metering pumps. The resulting structurally isomeric poly(ethyl ethylene) has a $\psi$ index of $3.3\times10^{-3}$ (kJ/mole/degree) and exists in H and Y structures. $R_1=R_3=R_4=C_2H_5$ and $R_2=R_5=H$ and y+z=380. The proportion of polymeric bridging elements, comprising vinyltrimethoxysilane and determined by IR spectroscopy, is 3.2% by weight.

EXAMPLE 17

Into a Werner & Pfleiderer twin-screw extruder of Example 16, having a temperature profile of 140° /170° /165° /190° /165° /190° /145°, a poly(ethyl ethylene co-ethylene) copolymer, with an ethylene content of 6 mole percent and a melt index of 3.5 g/10 min at 190° C./21.19 N, is added at the rate of 12 kg/h. To the melt in zone 3, a 10% solution of t-butyl pertoluate in acetone is added at a rate of 0.48 L/h. In zone 5, allyl methyl maleate, at a rate of 0.11 L/h, and a 10% solution of t-butyl pertoluate in acetone, at a rate of 0.84 L/h, are added over separate metering pumps. The resulting structurally isomeric poly(ethyl ethylene co-ethylene) copolymer has a $\psi$ index of $3.1\times10^{-3}$ (kJ/mole/degree) and exists in H and Y structures. $R_1=R_3=C_2H_5$ and $R_2=R_4=R_5=H$ and y+z=275. The proportion of polymeric bridging elements, comprising allyl methyl maleate and determined by IR spectroscopy, is about 0.75% by weight and the t/u ratio is about 16.

EXAMPLE 18

Into a Werner & Pfleiderer twin-screw extruder of Example 16, having a temperature profile of 140° /175° /190° /165° /190° /180° /145°, a poly(ethyl ethylene co-methylethylene) copolymer, with a methylethylene content of 92 mole percent and a melt index of 1.8 g/10 min at 230° C./21.19 N, onto which 0.17% of 3-methoxybenzoyl peroxide was drummed in the kneader, is added at the rate of 21 kg/h. In zone 4 of the extruder, a 20% solution of 3-methoxybenzoyl peroxide in methyl ethyl ketone, at a rate of 0.18 L/h, and allyl glycidyl hexyl hydrophthalate, at a rate of 0.16 L/h, are added over separate metering pump. The resulting structurally isomeric poly(ethyl ethylene co-methylethylene) copolymer has a $\psi$ index of $4.1 \times 10^{-3}$ (kJ/mole/degree) and exists in H and Y structures. $R_1=R_3=C_2H_5$ and $R_2=R_5=H$, $R_4=CH_3$ and y+z=790. The proportion of polymeric bridging elements, comprising allyl glycidyl hexyl hydrophthalate, is about 0.62% by weight and the t/u ratio is about 0.08.

EXAMPLE 19

Into a Werner & Pfleiderer twin-screw extruder of Example 16, having a temperature profile of 245° /270° /280° /260° /280° /270° /250°, a poly(isobutyl ethylene) homopolymer ($T_g=300°$ K, $M_w=6\times10^5$), onto which 0.18% of t-butyl peroxide was drummed, is added at the rate of 18 kg/h to the feeding funnel of the twin-screw extruder. In zone 4 of the extruder, a 10% solution of t-butyl cumyl peroxide in diethyl ketone, at a rate of 0.34 L/h, and diallyl phthalate, at a rate of 0.12 L/h, are added over separate metering pumps. The resulting structurally isomeric poly (isobutyl ethylene) has a $\psi$ index of $3.6\times10^{-3}$ (kJ/mole/degree) and exists in H and Y structures. $R_1=R_3=R_4=i-C_4H_9$ and $R_2=R_5=H$ and y+z=190. The proportion of polymeric bridging elements, comprising diallyl phthalate and determined by IR spectroscopy, is about 0.52% by weight.

EXAMPLE 20

Into a Werner & Pfleiderer twin-screw extruder of Example 16, having a temperature profile of 170° /205° /185° /170° /210° /170° /160°, a poly(methyl ethylene) homopolymer ($T_g=263°$ K., $M_w=6.1\times10^5$), onto which 0.31% of 2,6-di-t-butyl-4-methoxymethylphenol was drummed in the kneader, is added at the rate of 14 kg/h to the feeding funnel of the twin-screw extruder. In zone 4 of the extruder, a 10% solution of benzoyl peroxide in acetone, at a rate of 0.36 L/h, and divinyl benzene, at a rate of 0.042 L/h, are added over separate metering pumps. The resulting structurally isomeric poly(methyl ethylene) has a $\psi$ index of $3.9\times10^{-3}$ (kJ/mole/degree) and exists in H and Y structures. $R_1=R_3=R_4=CH_3$ and $R_2=R_5=H$ and y+z=580. The proportion of polymeric bridging elements, comprising divinylbenzene and determined by IR spectroscopy, is about 0.27% by weight.

EXAMPLE 21

Into a Werner & Pfleiderer twin-screw extruder of Example 16, having a temperature profile of 220° /260° /245° /280° /245° /270° /235°, a poly(isobutyl ethylene co-n-butylethylene) copolymer, with a butylethylene content of 42 mole percent and a melt index of 0.9 g/10 min at 230° C./49 N, is added at the rate of 19.5 kg/h to the feeding funnel of the twin-screw extruder. Into the melt in zone 3, a 20% solution of cumyl hydroperoxide in acetone as added at the rate of 0.195 L/h. In zone 5 of the extruder, a 20% solution of cumyl hydroperoxide in acetone, at a rate of 0.14 L/h, and dihydroxyoctane dimethacrylate, at a rate of 0.23 L/h, are added over separate metering pumps. The resulting structurally isomeric poly(isobutyl ethylene co-n-butylethylene) copolymer has a $\psi$ index of $3.7\times10^{-3}$ (kJ/mole/degree) and exists in H and Y structures. $R_1=R_3=i-C_4H_9$ and $R_2=R_5=H$, $R_4=n-C_4H_9$ and y+z=410. The proportion of polymeric bridging elements, comprising dihydroxyoctane dimethacrylate, is about 1.05% by weight and the t/u ratio is about 1.4.

EXAMPLE 22

Into a Werner & Pfleiderer twin-screw ZSK 53 extruder, L/D=36, with inert gas flow, vacuum, degassing and underwater granulation and having a temperature profile of 140° /165° /155° /180° /155° /185° /155°, a poly(ethyl ethylene co-phenylethylene) copolymer, with a phenylethylene content of 5 mole percent and a melt index of 6.8 g/10 min at 190° C./21.19 N, is added at the rate of 32 kg/h to the feeding funnel of the twin-screw extruder. Into the melt in zone 3, a 20% solution of decalin hydroperoxide in methyl ethyl ketone is added at a rate of 0.16 L/h. In zone 5 of the extruder, a 20% solution of decalin hydroperoxide, at the rate of 0.14 L/h, and a 50% solution of glycidyl acrylate in ethanol, at a rate of 0.29 L/h, are added over separate metering pumps. The resulting structurally isomeric poly (ethyl ethylene co-phenylethylene) copolymer has a $\psi$ index of $4.03\times10^{-3}$ (kJ/mole/degree) and exists in H and Y structures. $R_1=R_3=C_2H_5$ and $R_2=R_5=H$, $R_4=C_2H_5$ and y+z=240. The proportion of polymeric bridging elements, comprising glycidyl acrylate, is about 0.43% and the t/u ratio is about 19.

EXAMPLE 23

Into a Werner & Pfleiderer twin-screw extruder of Example 22 and having a temperature profile of 245° /27° /255° /28° /285° /280° /250°, a poly(isobutyl ethylene co-ethylene) copolymer, with an ethylene content of 8 mole percent and a melt index of 0.8 g/10 min at 230° C., is added at the rate of 38 kg/h to the feeding funnel of the twin-screw extruder. Into the melt in zone 3, a 20% solution of t-butyl hydroperoxide in diethyl ketone is added at a rate of 1.71 L/h. In zone 5 of the extruder, a 20% solution of t-butylcumyl peroxide in methyl ethyl ketone, at a rate of 0.95 L/h, and a liquid polyether comprising polyethylene glycol with terminal allyl groups, having a molecular weight of 1450, at a rate of 1.71 L/h, are added over separate metering pumps. The resulting structurally isomeric poly (isobutylene co-ethylene) copolymer has a $\psi$ index of $3.8\times10^{-3}$ (kJ/mole/degree) and exists in H and Y structures. $R_1=R_3=i-C_4H_9$, and $R_2=R_5=R_4=H$ and y+z=270. The proportion of polymeric bridging elements, comprising the polyether with terminal allyl groups and determined by IR spectroscopy, is about 4.1% and the t/u ratio is about 11.5.

EXAMPLE 24

Into a Werner & Pfleiderer twin-screw extruder of Example 22, having a temperature profile of 70° /200° /230° /230° /210° /200° /200°, a poly(methyl ethylene) homopolymer ($T_g=265°$ K, $M_w=4.9\times10^5$), onto which a mixture of 0.1% of t-butylperoxybenzoate, 0.2% of 1,3-propylene glycol benzenepropionate-3,5-bis(1,1-dimethylethyl)-4-hydroxy-2,2-bis((3-(3,5-bis(1,1-dimethylethyl)-4-hydroxyphenyl)-1-oxopropyl)-methyl) and 0.1% of di-t-butylhydroxytoluene were drummed, is added at the rate of 14.4 kg/h to the feeding funnel of the twin-screw extruder.

Into the metering opening of zone 3, a mixture of a poly(methyl ethylene) homopolymer with 0.2% of t-butyl peroxybenzoate and 0.3% divinylbenzene is added at the rate of 21.6 kg/h. The resulting blend of structurally isomeric poly(methyl ethylene) and the unmodified poly(methyl ethylene) homopolymer has a $\psi$ index of $4.2 \times 10^{-3}$ (kJ/mole/degree) and an $M_n$ value of $7.4 \times 10^4$.

EXAMPLE 25

Into a Werner & Pfleiderer twin-screw extruder of Example 22 and having a temperature profile of 140° /165° /180° /155° /185° /185° /155°, a poly(ethyl ethylene co-chloroethylene) copolymer, with a chlorine content of 4 mole percent and a melt index of 3.2 g/10 min at 190° C./21.19 N, onto which 0.026 kg of t-butyl perbenzoate and 0.084 kg of calcium stearate were drummed in the kneader, is added at the rate of 43 kg/h to the feeding funnel of the twin-screw extruder. To zone 4 of the extruder, a 20% solution of cumyl peroxide in acetone, at the rate of 0.066 L/h, and a 10% solution of triallyl isocyanurate in acetone, at the rate of 2.36 L/h, are added over separate metering pumps. The resulting structurally isomeric poly(ethyl ethylene co-chloroethylene) copolymer has a $\psi$ index of $3.6 \times 10^{-3}$ (kJ/mole/degree) and exists in H and Y structures. $R_1=R_3=i-C_4H_9$, and $R_2=R_5=H$, $R_4=Cl$ and y+z=310. The proportion of polymeric bridging elements comprising triallyl isocyanurate is 0.53%.

EXAMPLE 26

Into a Werner & Pfleiderer twin-screw extruder of Example 22 and having a temperature profile of 180° /210° /230° /195° /235° /235° /190°, a poly(methyl ethylene co-ethylene) copolymer, with an ethylene content of 7% and an $M_w$ of $3.5 \times 10^5$, onto which 0.123 kg of 2-t-butyl-4-methylphenol and 0.185 kg of behenic acid were drummed in the kneader, is added at the rate of 39 kg/h to the feeding funnel of the twin-screw extruder. In zone 4 of the extruder, a 20% solution of di-t-butyl peradipate in methyl ethyl ketone, at the rate of 0.154 L/h, and a 50% solution of trimethylolpropane trimethacrylate, at the rate of 0.115 L/h, are added over separate metering pumps. The resulting structurally isomeric poly(methyl ethylene co-ethylene) copolymer has a $\psi$ index of $4.8 \times 10^{-3}$ (kJ/mole/degree) and exists in H and Y structures. $R_1=R_3=CH_3$, $R_2=R_4=R_5=H$ and y+z=340 and w=680. The proportion of polymeric bridging elements comprising trimethylolpropane trimethacrylate is 0.15%.

EXAMPLE 27

Into a Werner & Pfleiderer twin-screw extruder of Example 22 and having a temperature profile of 140° /170° /190° /165° /185° /180° /155°, a poly(ethyl ethylene) homopolymer, ($T_g=248°$ K, $M_w=4 \times 10^6$), on which 0.066 kg of t-butyl pertoluate and 0.045 kg of bis 2,2,6,6-tetramethyl-4-piperidyl sebacate were drummed, is added at the rate of 33 kg/h to the feeding funnel of the twin-screw extruder. To zone 4 of the extruder, a 25% solution of t-butyl pertoluate in acetone, at the rate of 0.26 L/h, and ethylhexyl acrylate, at the rate of 1.15 L/h, are added over separate metering pumps. The resulting structurally isomeric poly(ethyl ethylene) homopolymer has a $\psi$ index of $3.4 \times 10^{-3}$ (kJ/mole/degree) and exists in H and Y structures. $R_1=R_3=R_4=C_2H_5$, $R_2=R_4=H$ and y+z=340 and w=680. The proportion of polymeric bridging elements comprising ethylhexyl acrylate is 0.15%.

EXAMPLE 28

The structurally isomeric poly(ethyl ethylene) of Example 16 (40 parts) is mixed with 60 parts of unmodified poly (butyl ethylene), 0.23 parts of 2-t-butyl-4,6-dimethylphenol, 0.10 parts of behenic acid, 0.20 parts of calcium stearate and 0.20 parts of poly-((1,1,3,3-tetramethylbutyl)-imino)-triazine-2,4-diyl)-(2,2,6,6-tetramethyl-piperidyl)-amino)-hexamethylene-4-(2,2,6,6-tetramethyl)piperidyl)imino) and homog-enized in the extruder at 140° /165° /175° /175° /175° /170° /155° C. The resulting compound has a $\psi$ index of $2.9 \times 10^{-3}$ (kJ/mole/degree).

EXAMPLE 29

The structurally isomeric poly(alkyl ethylenes) of Examples 20, 24, 26 (22 parts of each) are mixed with 15 parts of an unmodified poly(methyl ethylene co-ethylene) copolymer containing 50% of ethylene, 10 parts of an unmodified poly(ethyl ethylene co-methylethylene) copolymer containing 15% ethylene, 8 parts of talcum and 1 part of carbon black are homogenized in the extruder at 140° /190° /230° /220° /220° /210° /200° C. The alloy has a $\psi$ index of $2.7 \times 10^{-3}$ (kJ/mole/degree).

EXAMPLE 30

The structurally isomeric poly(isobutyl ethylene) of Example 19 is extruded in the extruder with a fishtail die at 265° to 285° C. into panels. Milled-out test pieces have the following characteristic values: tensile strength: 28 MPa, elongation at break: 15%, modulus of tension: 1.7 GPa, and modulus of bending: 1.5 GPa. The corresponding characteristic values for the unmodified poly(isobutyl ethylene) are 24 MPa, 15%, 1.3 GPa and 1.2 GPa.

EXAMPLE 31

In a bunker supply bin with impeller stirrer and a capacity of 0.2 m³, 50 kg of a poly(ethyl ethylene co-methylethylene) copolymer, with a methylethylene content of 92 mole percent, a melt index of 1.8 g/min at 230° C./21.9 N, are added pneumatically. Glycidyl acrylate (150 g) and 135 g of methoxybenzoyl peroxide are evaporated under vacuum by a vaporizer and supplied to the container with the help of the circulating gas, the modifiers being absorbed at 350° K. by the powdery copolymer. The mixture is added at the rate of 24 kg/h into a Werner & Pfleiderer ZSK 30 twin-screw extruder (L/D=42) under inert gas, with vacuum degassing and strand granulation and having a temperature profile of 100° /145° /175° /180° /185° /170° /145° C. The resulting structurally isomeric poly(ethyl ethylene co-methylethylene) copolymer has a $\psi$ index of $4.0 \times 10^{-3}$ (kJ/mole/degree) and is present in H and Y structures, wherein $R_1=R_3=C_2H_5$ and $R_2=R_5=H$, $R_4=CH_3$ and y+z=820. The proportion of polymeric bridging elements, comprising glycidyl acrylate and determined by IR spectroscopy, is approximately 0.28% by weight and the t/u ratio is about 0.08.

EXAMPLE 32

To a bunker supply bin of Example 31, 62 kg of a powdery poly(ethyl ethylene) homopolymer, ($T_g 248°$ K., $M_w=4 \times 10^5$) are added pneumatically. Ethylhexyl acrylate (1.86 kg) and 0.39 kg of t-butylpertoluate are evaporated under vacuum by a vaporizer and supplied to the container with the help of the circulating gas, the modifiers being absorbed at 340° K by the powdery polymer. The mixture is added at the rate of 19 kg/h into a twin-screw extruder of Example 1 with a temperature profile of 90° /130° /170° /175° /180° /180° 170° /145° C. The resulting structurally isomeric poly(ethyl ethylene) homopolymer has a $\psi$ index of 2.6×10$^{-3}$ (kJ/mole/degree) and is present in H and Y structures, wherein R$_1$=R$_3$=R$_4$=C$_2$H$_5$ and R$_2$=R$_4$=H and y+z=330 and w=660. The proportion of polymeric bridging elements comprising ethylhexyl acrylate is approximately 2.75%.

EXAMPLE 33

To a bunker supply bin of Example 31, 48 kg of a powdery poly(methyl ethylene) homopolymer (T$_g$=263° K., M$_w$=6×10$^5$) are added pneumatically. Allyl acrylate (168 g) and 120 g of di-t-butyl perbenzoate are evaporated under vacuum by a vaporizer and supplied to the container with the help of the circulating gas, the modifiers being absorbed at 355° K. by the powdery polymer. The mixture is added at the rate of 22 kg/h into a twin-screw extruder of Example 31 with a temperature profile of 100° /145° /180° /185° /180° /175° /160° C. The resulting structurally isomeric poly (methyl ethylene) homopolymer has a ψ index of 4.0×10$^{-3}$ (kJ/mole/degree) and is present in H and Y structures, wherein R$_1$=R$_3$=R$_4$=CH$_3$ and R$_2$=R$_5$=H and y+z=570. The proportion of polymeric bridging elements, determined by IR spectroscopy and comprising allyl acrylate, is approximately 0.33%.

EXAMPLE 34

To a bunker supply bin of Example 31, 46 kg of a powdery poly(isobutyl ethylene) homopolymer (T$_g$=300° K., M$_w$=6×10$^5$) are added pneumatically. Allyl methyl maleate (267 g) and 161 g of di-t-butyl hydroperoxide are evaporated under vacuum by a vaporizer and supplied to the container with the help of the circulating gas, the modifiers being absorbed at 430° K by the powdery polymer. The mixture is added at the rate of 16 kg/h into a twin-screw extruder of Example 1 with a temperature profile of 170° /220° /260° /265° /260° /250° /235° C. The resulting structurally isomeric poly(isobutyl ethylene) has a ψ index of 3.3×10$^{-3}$ (kJ/mole/degree) and is present in H and Y structures, wherein R$_1$=R$_3$=R$_4$=i-C$_4$H$_9$ and R$_2$=R$_5$=H and y+z=205. The proportion of polymeric bridging elements, determined by IR spectroscopy and comprising allyl methyl maleate, is approximately 0.54%.

EXAMPLE 35

To a bunker supply bin with an impeller stirrer and a capacity of 1.0 m$^3$, 250 kg of a powdery poly(methyl ethylene co-ethylene) copolymer, with an ethylene content of 7% and an M$_w$=3.5×10$^5$, are added pneumatically. Divinylbenzene (0.5 kg) and 0.5 kg of t-butyl perbenzoate are evaporated under vacuum by a vaporizer and supplied to the container with the help of the circulating gas, the modifiers being absorbed at 400° K. by the powdery copolymer. The copolymer, loaded with modifiers, is added at the rate of 45 kg/h, a 10% batch of 2-t-butyl-4-methylphenol is added at the rate of 13 kg/h and behenic acid is added at the rate of 35 kg/h to a Werner & Pfleiderer ZSK 53 twin-screw extruder (L/D=36) with a supply of inert gas, 3 conveyer-type scales, vacuum degassing and underwater granulation and having a temperature profile of 100° /145° /180° /185° /180° /175° /160° C. The resulting structurally isomeric poly(methylethylene co-ethylene) copolymer has a ψ index of 4.4×10$^{-3}$ (kJ/mole/degree) and is present in H and Y structures, wherein R$_1$=R$_3$=CH$_3$ and R$_2$=R$_4$=R$_5$=H and y+z=350 and w=700. The proportion of polymeric bridging elements comprising divinyl benzene is 0.18%.

EXAMPLE 36

To a bunker supply bin of Example 35, 220 kg of a powdery poly(isobutyl ethylene co-ethylene) copolymer, with an ethylene content of 8 mole percent and a melt index of 0.8 g/10 min at 230° C., are added. Vinyltrimethoxysilane (6.6 kg) and 1.1 kg of t-butyl pertolulate are evaporated under vacuum by a vaporizer and supplied to the container with the help of the circulating gas, the modifiers being absorbed at 445° K. by the powdery copolymer. The copolymer, loaded with modifiers, is added at the rate of 38 kg/h, calcium stearate is added at the rate of 0.24 kg/h and a 10% batch of octadecyl 3(3,5-di-t-butyl-4-hydroxyphenyl) propionate and bis-2,2,6,6-tetramethyl-4-piperidyl sebacate is added at the rate of 9.5 kg/h to a Werner & Pfleiderer ZSK 53 twin-screw extruder (L/D=36) with a supply of inert gas, 3 conveyer-type scales, vacuum degassing and underwater granulation and having a temperature profile of 170° /220° /260° /265° /260° /250° /235° C. The resulting structurally isomeric poly(isobutyl ethylene co-ethylene) copolymer has a ψ index of 3.4×10$^{-3}$ (kJ/mole/degree) and is present in H and Y structures, wherein R$_1$=R$_3$=i-C$_4$H$_9$ and R$_2$=R$_5$=R$_4$=H and y+z=270. The proportion of polymeric bridging elements, determined by IR spectroscopy and comprising vinyltrimethoxysilane, is 2.8% and the t/u ratio is 11.5.

EXAMPLE 37

Into a bunker supply bin of Example 35, 270 kg of a powdery poly(methylethylene) homopolymer (M$_w$=4.9× 10$^5$, T$_g$=265° K.), onto which a mixture of 0.2% of 1,3-propylene glycol benzenepropionate-3,5-bis(1,1-dimethylethyl)-4-hydroxy-2,2-bis((3-(3,5-bis(1,1-dimethylethyl)-4-hydroxyphenyl)-1-oxopro-poxy)methyl) and 0.1% of di-t-butylhydroxytoluene were drummed, are metered pneumatically. Styrene (4.05 kg) and 0.81 kg of t-butylpertoluate are evaporated under vacuum by a vaporizer and supplied to the container with the help of the circulating gas, the modifiers being absorbed at 385° K. by the powdery polymer. The powdery mixture is added at the rate of 48 kg/h to a Werner & Pfleiderer ZSK 53 twin-screw extruder (L/D=36) with a supply of inert gas, vacuum degassing and underwater granulation and having a temperature profile of 100° /145° /180° /185° /180° /175° /160° C. The resulting structurally isomeric poly(methyl ethylene) has a ψ index of 4.2×10$^{-3}$ (kJ/mole/degree) and is present in H and Y structures, wherein R$_1$=R$_3$=R$_4$=CH$_3$ and R$_2$=R$_5$=H and y+z=590. The proportion of polymeric bridging elements, determined by IR spectroscopy and comprising styrene, is 1.33%.

EXAMPLE 38

The structurally isomeric poly(isobutyl ethylene) of Examples 34 (45 parts) is mixed with 55 parts of unmodified poly(isobutyl ethylene), 0.28 parts of 2-t-butyl-4,6-dimethylphenol, 0.15 parts of behenic acid, 0.25 parts of calcium stearate and 0.15 parts of poly((1,1,3,3-tetramethylbutyl)-imino)-1,3,5-triazine-2,4,diyl)-(2,2,6,6-tetra-methylpiperidyl)-amino-hexamethylene-4-(2,2,6,6-tetramethyl)piperidyl)-imino) and homogenized in the extruder at 245° /270° /280° /280° /280° /270° /250° C. The resulting compound has a ψ index of 2.75×10$^{-3}$ (kJ/mole/ degree).

EXAMPLE 39

The structural isomeric poly(alkyl ethylenes) of Examples 31, 32 and 33 (20 parts of each) are homogenized with 20 parts of an unmodified poly(methyl ethylene co-ethylene) copolymer having an ethylene content of 8%, 10 parts of an unmodified poly(ethyl ethylene co-methylethylene) copolymer having an ethylene content of 15%, 9 parts of talcum and 1 part of carbon black in the extruder at 145° /190° /230° /230° /220° /210° /200° C. The alloy has a ψ index of 2.6×10$^{-3}$ (kJ/mole/degree).

EXAMPLE 40

The structurally isomeric poly(isobutyl ethylene) of Example 34 is extruded in the extruder with a fishtail die at 260° to 280° C. into panels. Milled-out test pieces have the following characteristic values: tensile strength: 29 MPa, elongation at break: 14%, modulus of tension: 1.8 GPa, and modulus of bending: 1.6 GPa. The corresponding characteristic values for the unmodified poly(isobutyl ethylene) are 24 MPa, 15%, 1.3 GPa and 1.2 GPa.

What is claimed is:

1. A method of synthesizing structurally isomeric poly (alkyl ethylenes) comprising:

irradiating a mixture of poly($C_1$ to $C_4$-alkyl ethylenes) and 0.02 to 5% by weight of at least one monomer selected from the group consisting of acrylic acid, $C_4$ to $C_{12}$ acrylic acid derivatives, allyl compounds, diacrylates, diallyl compounds, dienes, dimethacrylates, divinyl compounds, monovinyl compounds, polyacrylates, polymethacrylates and triallyl compounds in a fluidized bed at 333° to 448° K.;

the radiation being ionizing radiation having an energy of 150 to 10,000 KeV at a radiation dose of 0.5 to 80% KGy; and thermally treating the irradiated mixture at 380° to 550° K.

2. The method of claim 1, wherein:

the poly($C_1$ to $C_4$-alkyl ethylene) is at least one poly(alkyl ethylene) selected from the group consisting of poly (ethyl ethylenes) with glass transition temperatures of 242° to 250° K. and weight average molecular weights ranging from $2 \times 10^4$ to $3 \times 10^6$, poly(ethyl ethylene co-ethylene) copolymers containing 3 to 45 mole percent ethylene in the copolymer, poly(ethyl ethylene co-methylethylene) copolymers containing 3 to 97 mole percent of methylethylene in the copolymer, poly(isobutylenes) with glass transition temperatures of 295° to 303° K. and densities ranging from 0.813 to 0.832 g/cc at 25° C., poly(isobutyl ethylene co-n-butylethylene) copolymers with an n-butylethylene content of 3 to 97 mole percent, poly(isobutyl ethylene co-ethylene) copolymers with an ethylene content in the copolymer of 3 to 45 mole percent, poly(methyl ethylenes) with glass transition temperatures ranging from 259° to 266° K. and weight average molecular weights ranging from $1 \times 10^5$ to $8 \times 10^5$ and poly(methyl ethylene co-ethylene) copolymers with an ethylene content in the copolymer of 3 to 45 mole percent;

the step of irradiating occurs under inert conditions in the presence of at least one auxiliary material selected from the group consisting of 0.01 to 0.6% by weight of phenolic antioxidants, 0.01 to 0.6% by weight of high-temperature stabilizers comprising disulfides and polyethers, 0.01 to 6% by weight of processing stabilizers comprising phosphites, 0.01 to 8% by weight of processing stabilizers comprising sterically hindered amines, 0.1 to 1% by weight of antistatic agents, 0.2 to 3% by weight of pigments, 0.05 to 1% by weight of nucleating agents, 5 to 40% by weight of fillers, 2 to 20% by weight of flame retardants and 0.001 to 1% by weight of processing aids;

the step of irradiating employs an irradiator selected from the group consisting of nuclide irradiators with cobalt 60 radiation sources, Cockroft-Walton electron beam accelerators with radiation energies of 300 to 4500 KeV, and linear electron beam accelerators with beam current energies of 1,000 to 10,000 KeV;

the step of thermal treating occurring in extruders at temperatures ranging from 410° to 550° K. for a reaction time of 2 to 10 minutes; and further comprising adding 0.01 to 0.6% by weight of stabilizers to the mixture before the step of thermal treating.

3. The method of claim 1, wherein:

the poly($C_1$ to $C_4$-alkyl ethylene) is at least one poly(alkyl ethylene) selected from the group consisting of poly (ethyl ethylenes) with glass transition temperatures of 242° to 250° K. and weight average molecular weights ranging from $2 \times 10^4$ to $3 \times 10^6$, poly(ethyl ethylene co-ethylene) copolymers containing 3 to 45 mole percent ethylene in the copolymer, poly(ethyl ethylene co-methylethylene) copolymers containing 3 to 97 mole percent of methylethylene in the copolymer, poly(isobutylenes) with glass transition temperatures of 295° to 303° K. and densities ranging from 0.813 to 0.832 g/cc at 25° C., poly(isobutyl ethylene co-n-butylethylene) copolymers with an n-butylethylene content of 3 to 97 mole percent, poly(isobutyl ethylene co-ethylene) copolymers with an ethylene content in the copolymer of 3 to 45 mole percent, poly(methyl ethylenes) with glass transition temperatures ranging from 259° to 266° K. and weight average molecular weights ranging from $1 \times 10^5$ to $8 \times 10^5$ and poly(methyl ethylene co-ethylene) copolymers with an ethylene content in the copolymer of 3 to 45 mole percent;

the step of irradiating occurs under inert conditions in the presence of at least one auxiliary material selected from the group consisting of 0.01 to 0.6% by weight of phenolic antioxidants, 0.01 to 0.6% by weight of high-temperature stabilizers comprising disulfides and polyethers, 0.01 to 6% by weight of processing stabilizers comprising phosphites, 0.01 to 8% by weight of processing stabilizers comprising sterically hindered amines, 0.1 to 1% by weight of antistatic agents, 0.2 to 3% by weight of pigments, 0.05 to 1% by weight of nucleating agents, 5 to 40% by weight of fillers, 2 to 20% by weight of flame retardants and 0.001 to 1% by weight of processing aids;

the step of irradiating employs an irradiator selected from the group consisting of nuclide irradiators with cobalt 60 radiation sources, Cockroft-Walton electron beam accelerators with radiation energies of 300 to 4500 KeV, and linear electron beam accelerators with beam current energies of 1,000 to 10,000 KeV;

the step of thermal treating occurring in a solid phase at temperatures ranging from 380° to 500° K for a reaction time of 5 to 60 minutes; and further comprising adding 0.01 to 0.6% by weight of stabilizers to the mixture before the step of thermal treating.

4. A method of synthesizing structurally isomeric poly (alkyl ethylenes) comprising:

in a first step, in an extruder reacting a mixture of molten poly($C_1$ to $C_4$-alkyl ethylenes) and 0.01 to 3% by weight of at least one radical forming agent selected from the group consisting of acyl peroxides, alkyl peroxides, hydroperoxides and peresters; and a second step of feeding into the extruder and reacting with the molten reaction product of the first step at temperatures in the range of 140 to 320° C. 0.01 to 5% by weight of a mixture of at least one monomer selected from the group consisting of acrylic acid, $C_4$ to $C_{12}$ acrylic acid derivatives, allyl compounds, diacrylates, diallyl compounds, dienes, dimethacrylates, divinyl compounds, monovinyl compounds other than vinyl imidazole, polyacrylates, polymethacrylates and triallyl compounds, and 0.001 to 3.0% by weight of at least one radical forming agent selected from the group consisting of acyl peroxides, alkyl peroxides, hydroperoxides and peresters.

5. The method of claim 4, wherein:

the poly($C_1$ to $C_4$-alkyl ethylene) is at least one poly(alkyl ethylene) selected from the group consisting of poly(ethyl ethylenes) with glass transition temperatures of 242° to 250° K. and weight average molecular weights ranging from $2 \times 10^4$ to $3 \times 10^6$, poly(ethyl ethylene co-ethylene) copolymers containing 3 to 45 mole percent ethylene in the copolymer, poly(ethyl ethylene co-methylethylene) copolymers containing 3 to 97 mole percent of methylethylene in the copolymer, poly(isobutylenes) with glass transition temperatures of 295° to 303° K. and densities ranging from 0.813 to 0.832 g/cc at 25° C., poly(isobutyl ethylene co-n-butylethylene) copolymers with an n-butylethylene content of 3 to 97 mole percent, poly(isobutyl ethylene co-ethylene) copolymers with an ethylene content in the copolymer of 3 to 45 mole percent, poly(methyl ethylenes) with glass transition temperatures ranging from 259° to 266° K. and weight average molecular weights ranging from $1 \times 10^5$ to $8 \times 10^5$ and poly(methyl ethylene co-ethylene) copolymers with an ethylene content in the copolymer of 3 to 45 mole percent;

the extruding process is continuous and occurs under inert conditions;

the mixture in the first step is formed by the radical agent being drummed up on the poly($C_1$ to $C_4$-alkyl ethylene) in a kneader and being metered together or metered as a solution into the poly($C_1$ to $C_4$-alkyl ethylene) melt in zones 2 to 4 of the extruder;

the second step further comprises adding at least one auxiliary material selected from the group consisting of 0.01 to 0.6% by weight of phenolic antioxidants, 0.01 to 0.6% by weight of high-temperature stabilizers comprising disulfides and polyethers, 0.01 to 6% by weight of processing stabilizers comprising phosphites, 0.01 to 8% by weight of processing stabilizers comprising sterically hindered amines, 0.1 to 1% by weight of antistatic agents, 0.2 to 3% by weight of pigments, 0.05 to 1% by weight of nucleating agents, 5 to 40% by weight of fillers, 2 to 20% by weight of flame retardants and 0.001 to 1% by weight of processing aids;

in the second step, the radical forming agents and the monomers are metered in using separate metering equipment or jointly as a solution into the poly($C_1$ to $C_4$-alkyl ethylene) melt in zones 3 to 6 of the extruder, with an additional amount of poly($C_1$ to $C_4$-alkyl ethylene).

* * * * *